United States Patent
Shiraishi et al.

(10) Patent No.: US 11,945,431 B2
(45) Date of Patent: Apr. 2, 2024

(54) VEHICLE CONTROL APPARATUS

(71) Applicant: SUBARU CORPORATION, Tokyo (JP)

(72) Inventors: Eiichi Shiraishi, Tokyo (JP); Takashi Takeda, Tokyo (JP); Shintaro Ikeda, Tokyo (JP); Satoru Akiyama, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 197 days.

(21) Appl. No.: 17/553,197

(22) Filed: Dec. 16, 2021

(65) Prior Publication Data

US 2022/0203970 A1 Jun. 30, 2022

(30) Foreign Application Priority Data

Dec. 24, 2020 (JP) ................. 2020-214542

(51) Int. Cl.
*B60W 30/085* (2012.01)
*B60R 21/0134* (2006.01)
(Continued)

(52) U.S. Cl.
CPC ....... *B60W 30/085* (2013.01); *B60R 21/0134* (2013.01); *B60W 10/184* (2013.01);
(Continued)

(58) Field of Classification Search
CPC ............. B60W 30/085; B60W 30/04; B60W 30/0956; B60W 10/184; B60W 10/20;
(Continued)

(56) References Cited

U.S. PATENT DOCUMENTS 11,136,021 B1 * 10/2021 Funke .................... B62D 7/159
2021/0229642 A1 * 7/2021 Komori .................. B60T 8/241

FOREIGN PATENT DOCUMENTS

JP 09-142284 A 6/1997
JP 2002-316629 A 10/2002
(Continued)

OTHER PUBLICATIONS

JP-2005254944-A Machine English translation (Year: 2005).*

*Primary Examiner* — Jason D Shanske
*Assistant Examiner* — Matthew James O'Neill
(74) *Attorney, Agent, or Firm* — Rimon P.C.

(57) ABSTRACT

A vehicle control apparatus includes a braking controller individually controlling braking forces of braking devices for left and right front and rear wheels, a side collision detector detecting a side collision against a vehicle, and a yaw behavior detector detecting yaw behavior of a vehicle body. If the yaw behavior detected after the side collision is such that a rear of the vehicle body shifts away from a collision side relative to a front thereof, the braking controller executes yaw amplification control to cause the braking device for the collision-side front wheel to generate a braking force larger than the remaining wheels. If the detected yaw behavior is such that the front shifts away from the collision side relative to the rear, the braking controller executes the yaw amplification control to cause the braking device for the collision-side rear wheel to generate a braking force larger than the remaining wheels.

9 Claims, 3 Drawing Sheets

(51) Int. Cl.
   *B60W 10/184*  (2012.01)
   *B60W 10/20*  (2006.01)
   *B60W 30/04*  (2006.01)
   *B60W 30/095*  (2012.01)
   *B60W 30/08*  (2012.01)

(52) U.S. Cl.
   CPC ............ *B60W 10/20* (2013.01); *B60W 30/04* (2013.01); *B60W 30/0956* (2013.01); *B60W 2030/082* (2013.01); *B60W 2420/42* (2013.01); *B60W 2520/14* (2013.01); *B60W 2520/18* (2013.01); *B60W 2554/801* (2020.02); *B60W 2720/14* (2013.01)

(58) Field of Classification Search
   CPC ....... B60W 2030/082; B60W 2420/42; B60W 2520/14; B60W 2520/18; B60W 2554/801; B60W 2720/14; B60R 21/0134; B60R 21/00; B60R 21/01; B60R 21/0136; B60R 2021/0006; B60R 2021/001013; B60R 2021/01211; B60T 7/22; B60T 8/17551; B60T 8/17552; B60T 8/17554; B60T 8/243; B60T 8/3205; B60T 2230/03
   See application file for complete search history.

(56) References Cited

FOREIGN PATENT DOCUMENTS

| JP | 2005-178630 A | | 7/2005 |
|----|---------------|---|--------|
| JP | 2005-254944 A | | 9/2005 |
| JP | 2005254944 A | * | 9/2005 |
| JP | 2016-047672 A | | 4/2016 |

\* cited by examiner

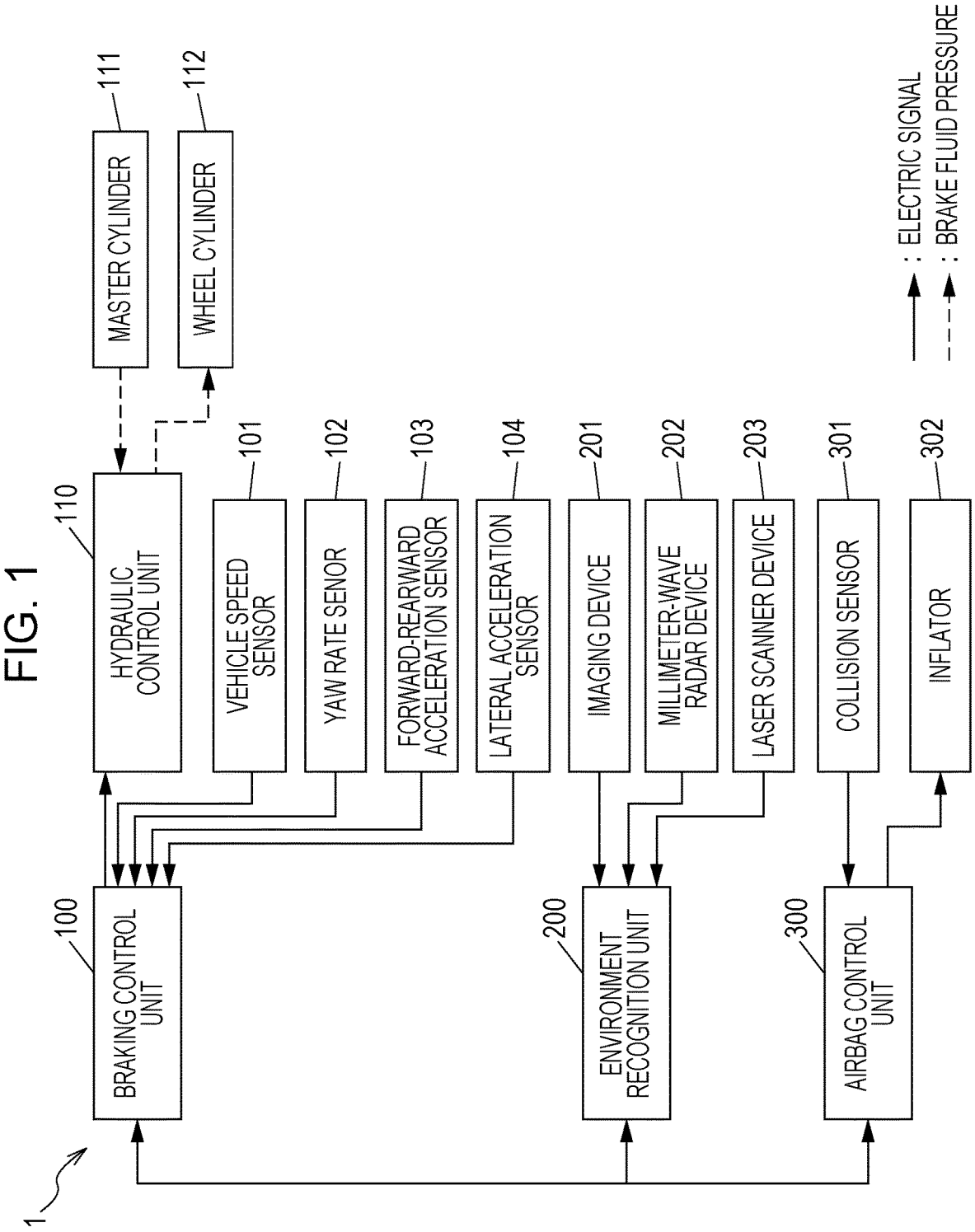

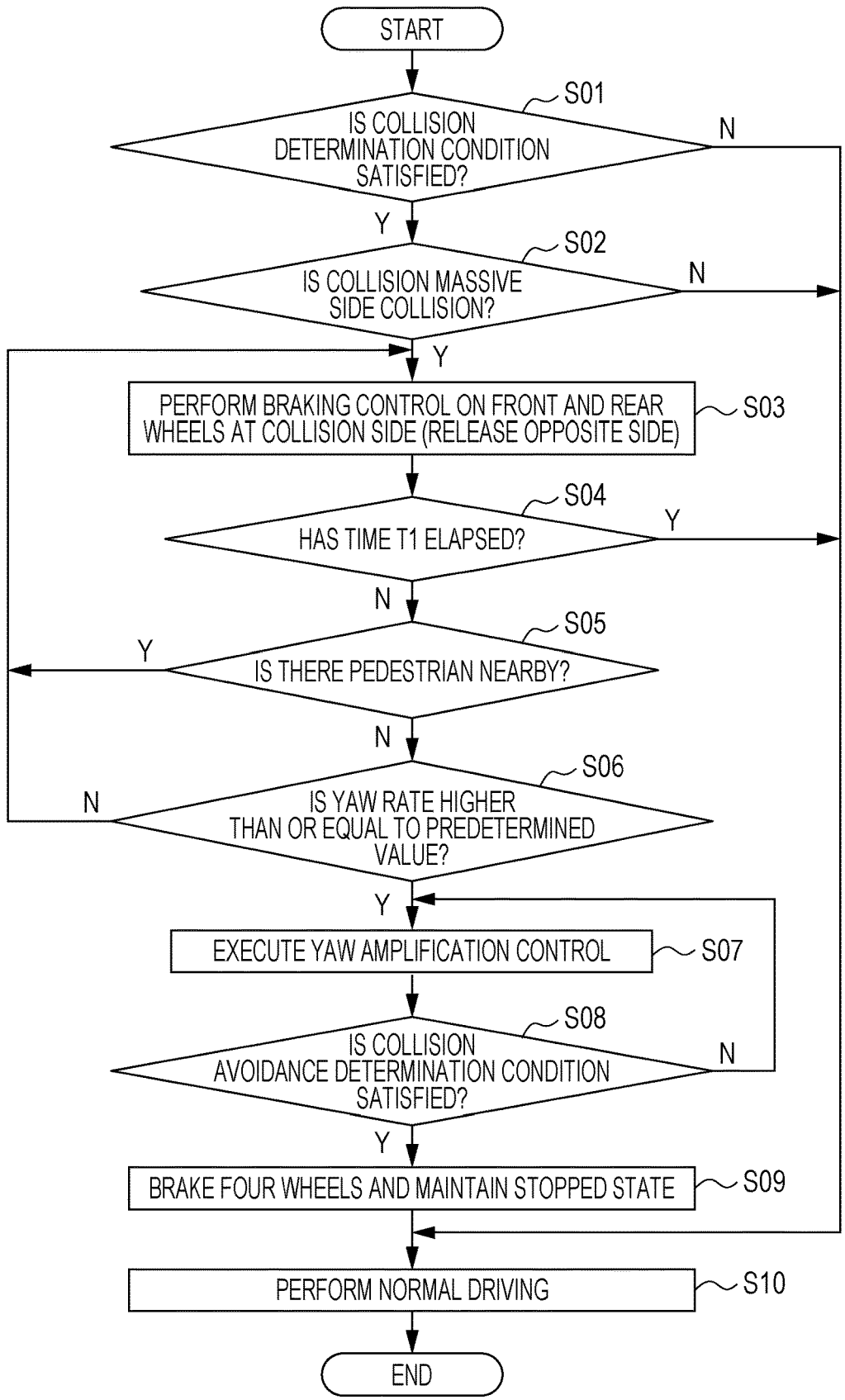

VEHICLE CONTROL APPARATUS

CROSS-REFERENCE TO RELATED APPLICATIONS

The present application claims priority from Japanese Patent Application No. 2020-214542 filed on Dec. 24, 2020, the entire contents of which are hereby incorporated by reference.

BACKGROUND

The disclosure relates to vehicle control apparatuses that control vehicle behavior occurring during side collisions.

For example, Japanese Unexamined Patent Application Publication (JP-A) No. H9-142284 describes a technique in the related art regarding vehicle control during a collision of a vehicle, such as an automobile. In this technique, either one of the left and right driving wheels coupled to each other by a differential device is braked during the collision, so that a yaw moment acting in the same direction as yawing occurring due to the collision is generated in accordance with the braking-force difference between the left and right driving wheels, thereby alleviating the impact of the collision.

In JP-A No. 2005-254944, the braking force on the rear wheel located opposite from a side collision of the vehicle is controlled to be larger than the braking forces on the three remaining wheels, until the vehicle-body acceleration becomes a predetermined value or lower from a time point immediately prior to the collision to a time point after the collision.

In JP-A No. 2002-316629, either one of the left and right wheels is braked when the vehicle is turned due to a collision, thereby suppressing the turning of the vehicle.

In JP-A No. 2016-47672, a braking force is generated automatically when roll occurs due to a collision, and the braking force is reduced for preventing the vehicle from rolling over if the roll rate is high.

In JP-A No. 2005-178630, a force acting in the vehicle roll direction during a side collision is reduced by terminating antilock brake system (ABS) control to lock the wheels and thus reducing a lateral force acting on the wheels.

SUMMARY

An aspect of the disclosure provides a vehicle control apparatus to be applied to a vehicle. The vehicle control apparatus includes a braking controller, a side collision detector, and a yaw behavior detector. The braking controller is configured to individually control braking forces of braking devices provided respectively for a left front wheel, a right front wheel, a left rear wheel, and a right rear wheel of the vehicle. The side collision detector is configured to detect a side collision against the vehicle. The yaw behavior detector is configured to detect yaw behavior of a vehicle body of the vehicle. The braking controller is configured to execute yaw amplification control. The yaw amplification control includes, in a case where the yaw behavior detector detects the yaw behavior after the side collision, the yaw behavior occurring in a direction in which a rear of the vehicle body shifts toward a side opposite from a collision side relative to a front of the vehicle body causing the braking device for one of the left front wheel and the right front wheel that is at the collision side to generate a braking force larger than the other one of the left front wheel and the right front wheel, the left rear wheel, and the right rear wheel. The yaw amplification control includes, in a case where yaw behavior detector detects, after the side collision, the yaw behavior occurring in a direction in which the front of the vehicle body shifts toward the side opposite from the collision side relative to the rear of the vehicle body, causing the braking device for one of the left rear wheel and the right rear wheel that is at the collision side to generate a braking force larger than the other one of the rear wheel and the right rear wheel, the left front wheel, and the right front wheel An aspect of the disclosure provides a vehicle control apparatus to be applied to a vehicle. The vehicle control apparatus includes circuitry. The circuitry is configured to individually control braking forces of braking devices respectively provided for a left front wheel, a right front wheel, a left rear wheel, and a right rear wheel of the vehicle. The circuitry is configured to detect a side collision against the vehicle. The circuitry is configured to detect yaw behavior of a vehicle body of the vehicle. The circuitry is configured to execute yaw amplification control. The yaw amplification control includes, upon detecting the yaw behavior after the side collision, the yaw behavior occurring in a direction in which a rear of the vehicle body shifts toward a side opposite from a collision side relative to a front of the vehicle body causing the braking device for one of the left front wheel and the right front wheel that is at the collision side to generate a braking force larger than the other one of the left front wheel and the right front wheel, the left rear wheel, and the right rear wheel. The yaw amplification control includes, upon detecting, after the side collision, the yaw behavior occurring in a direction in which the front of the vehicle body shifts toward the side opposite from the collision side relative to the rear of the vehicle body, causing the braking device for one of the left rear wheel and the right rear wheel to generate a braking force larger than the other one of the rear wheel and the right rear wheel, the left front wheel, and the right front wheel, the one of the left rear wheel and the right rear wheel being at the collision side.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

FIG. 1 is a block diagram schematically illustrating the configuration of a vehicle control apparatus according to an embodiment of the disclosure;

FIG. 2 is a flowchart illustrating the operation of the vehicle control apparatus according to the embodiment.

DETAILED DESCRIPTION

Figure 3A:
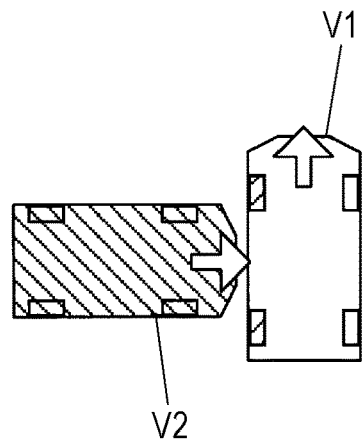
FIG. 3A to FIG. 3C schematically illustrate an example of vehicle behavior during a side collision in a time series fashion.

In the technique described in JP-A No. 9-142284, when yaw behavior occurs in the vehicle as a result of a side collision, the impact of the collision can be alleviated by facilitating this yaw behavior.

However, since either one of the left and right driving wheels of the vehicle is subjected to braking in the technique described in JP-A No. 9-142284, if the vehicle is, for example, a two-wheel drive vehicle, the effect of facilitating the yaw behavior is simply generated by either of the front and rear wheels, thus making it difficult to cope with various types of collisions.

In the technique described in JP-A No. 2005-254944, the wheels to be braked are switched in accordance with a predicted colliding position. In any case, the wheel located opposite from the collision side in the vehicle-width direction is braked. Hence, the distance from the position where the collision is input to the vehicle body and the braked wheel acting as a pivot point for the yaw behavior is large, thus making it difficult to obtain a high yaw rate.

It is desirable to provide a vehicle control apparatus that reduces damage during a side collision by controlling a braking device.

A vehicle control apparatus according to an embodiment of the disclosure will be described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

The vehicle control apparatus according to the embodiment is equipped in an automobile, such as a car.

The vehicle control apparatus according to the embodiment has a function of performing, for example, yaw amplification control and roll suppression control when the vehicle is involved in a side collision with an object, such as another vehicle. Yaw amplification control involves facilitating yaw behavior of the vehicle body to alleviate the impact caused by the collision. Roll suppression control involves suppressing roll.

FIG. 1 is a block diagram schematically illustrating the configuration of the vehicle control apparatus according to the embodiment.

A vehicle control apparatus 1 has, for example, a braking control unit 100, a hydraulic control unit 110, an environment recognition unit 200, and an airbag control unit 300.

Each unit may be a microcomputer having, for example, an information processor, such as a central processing unit (CPU), storage units, such as a random access memory (RAM) and a read-only memory (ROM), an input/output interface, and a bus that couples these components to one another.

The units are capable of transmitting various kinds of information via a vehicular local area network (LAN), such as a controller-area-network (CAN) communication system, or by directly communicating with each other.

The braking control unit 100 controls hydraulic service brakes (i.e., braking devices) (not illustrated) provided for the individual wheels of the vehicle. In one embodiment, the braking control unit 100 may serve as a "braking controller".

The braking control unit 100 is capable of individually controlling the brake fluid pressures on wheel cylinders 112 of the respective wheels and causing the service brakes of the wheels to generate braking forces by giving a command to the hydraulic control unit 110.

The braking control unit 100 is coupled to physical sensors that detect the motional states of the vehicle and that include a vehicle speed sensor 101, a yaw rate sensor 102, a forward-rearward acceleration sensor 103, and a lateral acceleration sensor 104.

The vehicle speed sensor 101 is configured to detect the rotational speed (i.e., wheel speed) of each wheel. Based on an output from the vehicle speed sensor 101, the travel speed of the vehicle can be calculated.

The yaw rate sensor 102 detects a yaw rate serving as the rotational speed (i.e., rotational velocity) around the vertical axis of the vehicle body. In one embodiment, the yaw rate sensor 102 may serve as a "yaw behavior detector".

The forward-rearward acceleration sensor 103 is configured to detect acceleration acting on the vehicle body in the front-rear direction.

The lateral acceleration sensor 104 is configured to detect acceleration acting on the vehicle body in the lateral direction (i.e., vehicle-width direction).

An output from each sensor is used in various kinds of vehicle motion control to be described below, including antilock braking control, orientation stabilization control, and yaw amplification control.

Antilock braking control involves, for example, reducing the brake fluid pressures on the wheels when wheel locking occurs during braking, so as to recover the rotation of the wheels.

Orientation stabilization control involves generating a braking-force difference between the left and right wheels when either of oversteer behavior and understeer behavior occurs in the vehicle, so as to generate a yaw moment in a direction for suppressing the behavior.

The braking control unit 100 calculates a target yaw rate, serving as a yaw rate that may occur in the vehicle body during normal traveling, based on, for example, the steering angle detected by a steering angle sensor (not illustrated), the vehicle speed detected by the vehicle speed sensor 101, and the lateral acceleration detected by the lateral acceleration sensor 104.

In accordance with a deviation between the actual yaw rate (i.e., real yaw rate) detected by the yaw rate sensor 102 and the target yaw rate, the braking control unit 100 sets the direction and the magnitude of the yaw moment to be generated in the braking control.

If the absolute value of the real yaw rate is smaller than the absolute value of the target yaw rate, it is assumed that understeer behavior has occurred, and a yaw moment acting in the same direction as the yaw rate is thus generated toward the steering angle (i.e., in the steering direction) of the steering device.

In contrast, if the absolute value of the real yaw rate is larger than the absolute value of the target yaw rate, it is assumed that oversteer behavior has occurred, and a yaw moment acting in the opposite direction from the yaw rate is thus generated in the steering direction of the steering device.

The braking control unit 100 has a function of executing post-collision braking control (including post-crash braking control and multi-collision braking control) for automatically generating a braking force when a collision involving a predetermined impact (such as acceleration) or more occurs on the vehicle, so as to decelerate and stop the vehicle.

The braking control unit 100 also has a function of performing roll suppression control and yaw amplification control in a case of a side collision where an object, such as another vehicle, collides with a side surface of the vehicle.

Roll suppression control involves suppressing roll behavior occurring due to the collision. Yaw amplification control involves facilitating yaw behavior occurring due to the collision.

These features will be described in detail later.

The hydraulic control unit 110 is a hydraulic pressure controller that individually adjusts the brake fluid pressures of the wheel cylinders 112 of the respective wheels.

The hydraulic control unit 110 includes, for example, an electric pump for pressurizing the brake fluid, as well as a pressure increasing valve, a pressure reducing valve, and a pressure maintaining valve for controlling the brake fluid pressures of the wheel cylinders 112.

The hydraulic control unit 110 is coupled to, for example, a master cylinder 111 and the wheel cylinders 112 by using brake fluid pipes.

The master cylinder 111 pressurizes the brake fluid in accordance with an operation performed by the driver on the brake pedal (not illustrated) for a braking operation.

The brake fluid pressure generated by the master cylinder 111 is transmitted to each wheel cylinder 112 via the hydraulic control unit 110.

The hydraulic control unit 110 has a function of increasing and reducing the brake fluid pressure generated by the master cylinder 111, where appropriate, so as to increase and reduce the brake fluid pressures of the respective wheel cylinders 112.

The wheel cylinders 112 are provided for the individual wheels and are each configured to generate a frictional force (i.e., braking force) according to the brake fluid pressure by, for example, pressing a brake pad against a disk rotor.

The environment recognition unit 200 has a function of recognizing the environment surrounding the vehicle by using various kinds of sensors to determine the shape of the surrounding road, determine whether there is an obstacle, such as another vehicle, a pedestrian, a building, and a land feature, existing near the vehicle, and detect the relative position and the relative speed of the obstacle with respect to the vehicle if the obstacle exists.

The environment recognition unit 200 is coupled to sensors that detect, for example, objects surrounding the vehicle. Examples of the sensors include an imaging device 201, a millimeter-wave radar device 202, and a laser scanner device 203.

The imaging device 201 has, for example, either of a stereo camera and a monocular camera.

The environment recognition unit 200 performs known image processing on an image captured by the imaging device 201 so as to be capable of recognizing objects surrounding the vehicle and determining the attributes of the objects (e.g., a vehicle, a pedestrian, and a building).

The millimeter-wave radar device 202 is configured to detect an object by using, for example, a 76-GHz radio wave.

The laser scanner device 203 is configured to scan an area surrounding the vehicle by emitting a pulsed laser beam and detect an object by detecting scattered light caused by the reflection of the pulsed laser beam.

The airbag control unit 300 is provided inside the vehicle cabin and is configured to control the deployment of each airbag serving as a vehicle-occupant restraining device that restrains a vehicle occupant during a collision.

Each airbag has a shape of a bag formed by using a nylon base fabric and is normally accommodated in a folded state within an interior member. During a collision, the airbag deploys by receiving deployment gas, so as to restrain the vehicle occupant.

The airbag control unit 300 is coupled to, for example, a collision sensor 301 and an inflator 302.

The collision sensor 301 includes a plurality of collision sensors that are provided at various locations of the vehicle body and that are configured to detect significantly large acceleration acting in the front-rear direction and the lateral direction on the vehicle body during a collision.

Each collision sensor 301 functions as a collision detector by operating in cooperation with the airbag control unit 300.

The airbag control unit 300 determines whether a frontal collision or a side collision that may involve deployment of each airbag has occurred based on an output from the collision sensor 301. In one embodiment, the airbag control unit 300 may serve as a "side collision detector".

The inflator 302 is a gas generator that supplies deployment gas to each airbag provided in the vehicle in response to a command from the airbag control unit 300.

The operation of the vehicle control apparatus 1 according to the embodiment during a side collision will be described below.

FIG. 2 is a flowchart illustrating the operation of the vehicle control apparatus 1 according to the embodiment.

The steps will be described below in a predetermined sequence.

In step S01, the airbag control unit 300 determines whether an object, such as another vehicle, has collided with the vehicle with a predetermined intensity or more (e.g., whether the acceleration occurring in the vehicle body of the vehicle is higher than or equal to a predetermined value) based on an output from any one of the collision sensors 301.

For example, if the acceleration detected is higher than or equal to a predetermined threshold value used for determining whether the airbags are to be deployed, a collision determination condition can be satisfied.

If a collision with the predetermined intensity or more is determined, the collision determination condition is satisfied, and the process proceeds to step S02. Otherwise, the process proceeds to step S10.

In step S02, the airbag control unit 300 determines whether the collision determined in step S01 is a massive side collision of a predetermined degree or more.

For example, if the lateral acceleration of the vehicle body is higher than or equal to a predetermined threshold value, it is determined that a massive side collision has occurred.

If the collision is determined as a massive side collision, the process proceeds to step S03. Otherwise, the process proceeds to step S10.

In step S03, the braking control unit 100 gives a command to the hydraulic control unit 110 to cause the brakes for the front and rear wheels to generate braking forces at the collision side (e.g., at the left side if the collision has occurred at the left side surface of the vehicle) in the vehicle-width direction.

In this case, the brakes for the front and rear wheels located opposite from the collision side in the vehicle-width direction are set in a released state where the brakes substantially do not generate braking forces.

Such control functions as roll suppression control for suppressing roll behavior of the vehicle body occurring due to a side collision.

Normally, when a vehicle is involved in a side collision, the vehicle experiences roll behavior in which the suspension at the collision side temporarily travels in a stroke toward the bump side (i.e., contraction side) to lower the vehicle body, and subsequently travels in a stroke toward the rebound side (i.e., extension side) in accordance with the reactive force of the suspension spring to lift the vehicle body.

Such roll behavior is not desirable from the standpoint of stable post-collision vehicle-body behavior, and may also cause the vehicle to roll over if the behavior becomes significantly large.

On the other hand, a vehicle suspension system experiences behavior in which the wheels shift in the front-rear direction relative to the vehicle body during a normal stroke due to, for example, tilting of a trailing link used for positioning the wheels in the front-rear direction.

Thus, if the front-rear shifting of the wheels relative to the road surface is kept under restraint by braking, friction that inhibits the stroke of the suspension system can be generated, so that the roll behavior of the vehicle body can be suppressed in accordance with the above-described control.

Subsequently, the process proceeds to step S04.

In step S04, the airbag control unit 300 compares the time elapsed from the occurrence of the collision with a predetermined threshold value T1 (seconds).

For example, the threshold value T1 is set in view of the time it takes for vehicle-body behavior occurring due to a normal side collision to return to normal after the occurrence of the collision.

If the time elapsed from the occurrence of the collision exceeds the threshold value T1 (seconds), the process proceeds to step S10. Otherwise, the process proceeds to step S05.

In step S05, the environment recognition unit 200 determines whether there is a risky object, such as a pedestrian, around the vehicle (particularly in the direction in which the vehicle is to travel due to the behavior after the collision).

If there is a risky object, the process proceeds to step S06. Otherwise, the process returns to step S03 to repeat the steps thereafter.

In step S06, the braking control unit 100 uses the yaw rate sensor 102 to detect a yaw rate of the vehicle body, and compares the yaw rate with a predetermined threshold value.

If the yaw rate is higher than or equal to the threshold value, it is determined that yaw behavior has occurred. In this case, the process proceeds to step S07. Otherwise, the process returns to step S03 to repeat the steps thereafter.

In step S07, the braking control unit 100 terminates the roll suppression control and executes yaw amplification control for amplifying (i.e., facilitating) the yaw behavior occurring due to the side collision.

The braking control unit 100 acquires information related to the current yaw rate of the vehicle body from the yaw rate sensor 102.

If the yaw behavior of the vehicle body ascertained based on the yaw rate is such that the rear of the vehicle body shifts toward the opposite side from the collision side relative to the front of the vehicle body, the braking control unit 100 brakes the front wheel at the collision side and sets the remaining wheels in a non-braking state.

If the yaw behavior of the vehicle body is such that the front of the vehicle body shifts toward the opposite side from the collision side relative to the rear of the vehicle body, the braking control unit 100 brakes the rear wheel at the collision side and sets the remaining wheels in a non-braking state.

Accordingly, the yaw behavior of the vehicle occurring about the braked wheel acting as a pivot point is amplified, so that the yaw rate is increased.

Subsequently, the process proceeds to step S08.

In step S08, the braking control unit 100 determines whether the vehicle has avoided a collision with another vehicle.

For example, when the yaw rate detected by the yaw rate sensor 102, the acceleration detected by the forward-rearward acceleration sensor 103, and the acceleration detected by the lateral acceleration sensor 104 are all lower than or equal to the corresponding predetermined threshold values, it is determined that a collision with another vehicle has been completely avoided in accordance with the yaw behavior (i.e., collision avoided state).

If it is determined that the collision avoided state is achieved (i.e., if it is determined that a collision avoidance determination condition is satisfied), the process proceeds to step S09. Otherwise, the process returns to step S07 to repeat the steps thereafter.

In step S09, the braking control unit 100 terminates the yaw amplification control and causes all the brakes for the left and right front wheels and the left and right rear wheels to generate braking forces, thereby maintaining the vehicle in a stopped state.

When a certain time period elapses in this state or when an operation for cancelling the stopped state is input from a user, such as the driver, the process subsequently proceeds to step S10.

In step S10, the units, such as the braking control unit 100, constituting the vehicle control apparatus 1 are set in a controlled state in the normal driving of the vehicle.

Subsequently, the sequential process ends (i.e., returns to the beginning).

Figure 3B:
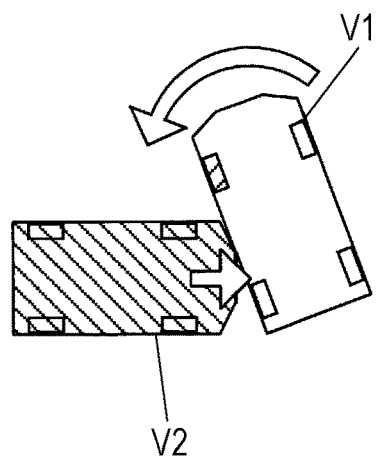
Figure 3C:
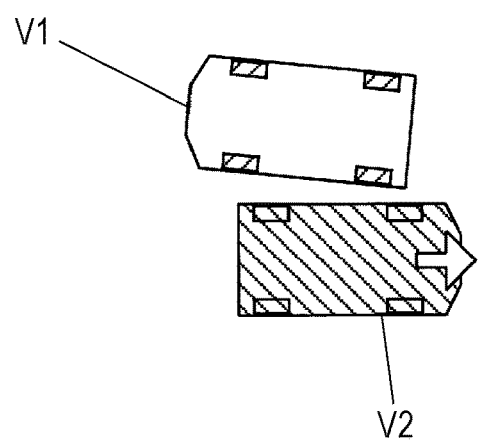

FIG. 3A to FIG. 3C schematically illustrate an example of vehicle behavior during a side collision in a time series fashion.

FIG. 3A to FIG. 3C illustrate a side collision where another vehicle V2 has collided with the left side surface of a vehicle V1 in the vehicle-width direction of the vehicle V1.

In the vehicle V1, a shaded wheel indicates that a braking force has been generated thereon.

FIG. 3A illustrates a state where the collision has occurred.

In this case, the braking control unit 100 generates braking forces on the front and rear wheels at the collision side (i.e., left side).

Accordingly, roll behavior of the vehicle V1 occurring due to the side collision is suppressed, so that subsequent vehicle-body behavior can be stabilized.

In FIG. 3A to FIG. 3C, the vehicle V2 has collided with the rear side of the vehicle V1 relative to the center of gravity thereof. As a result, the vehicle V1 experiences yaw behavior that causes the rear of the vehicle body to shift (i.e., rotate counterclockwise) toward the opposite side (i.e., the right side) from the collision side relative to the front of the vehicle body.

FIG. 3B illustrates a state where yaw behavior has occurred in the vehicle V1.

In this state, the braking control unit 100 generates a braking force on the left front wheel.

Accordingly, the vehicle V1 experiences drastic yaw behavior about the left front wheel acting as a pivot point, and evacuates from the travel path of the vehicle V2.

If there is a risky object, such as a pedestrian, around the vehicle V1, such yaw amplification control is prohibited.

FIG. 3C illustrates a state where the vehicle V1 has completely avoided the vehicle V2 (i.e., a state where the collision avoidance determination condition is satisfied).

In this state, the braking control unit 100 generates braking forces on all the wheels.

As described above, the embodiment can achieve the following effects.

1. In accordance with the direction of yaw behavior occurring due to a side collision, it is determined whether either of the front and rear wheels is to be braked, and yaw amplification control for braking either of the front and rear wheels at the collision side in the vehicle-width direction is performed, so that the yaw behavior occurring about the braked wheel acting as a pivot point (i.e., axis) can be amplified.

Furthermore, by braking the wheel at the collision side in the vehicle-width direction, the wheel acting as a pivot point (i.e., the braked wheel) and the position where the collision is input are disposed close to each other in terms of the distance therebetween. Thus, a high yaw rate can be generated, and the impact caused by the collision can be effectively alleviated. In addition, the vehicle can be quickly shifted to a position where the vehicle can allow the colliding vehicle to pass by.

2. The yaw amplification control is prohibited if the environment recognition unit 200 detects a risky object, such as a pedestrian. Thus, the vehicle spinning as a result of facilitating, that is, amplifying, the yaw behavior can be prevented from colliding with the risky object, such as a pedestrian, thereby preventing secondary damage from occurring.

3. By performing roll suppression control for causing the braking devices for the front and rear wheels at the collision side to generate braking forces in accordance with a side collision, these wheels are restrained in the front-rear direction relative to the road surface, so that friction that inhibits a stroke of the suspension system normally involving forward-rearward shifting of the wheels during the stroke can be generated. Thus, roll behavior occurring in a direction that lowers the collision side due to the side collision and roll behavior occurring in a direction that lifts the collision side due to the rebound thereof are suppressed, so that stable post-collision vehicle-body behavior can be achieved.

4. After the yaw amplification control is executed, braking forces are generated on all the wheels to maintain the vehicle in a stopped state in accordance with whether the behavior of the vehicle caused by the side collision has returned to normal (i.e., whether the collision avoidance determination condition is satisfied), so that the vehicle is prevented from moving against the intention of the user, such as the driver, after the collision, thereby achieving increased safety.

Modifications

The embodiment of the disclosure is not limited to that described above and permits various modifications and alterations that are included in the technical scope of the embodiment of the disclosure.

1. The configuration of the vehicle control apparatus 1 and the configuration of the vehicle are not limited to those in the above embodiment and may be modified, as appropriate.

For example, the allocation of the functions to the individual units is an example and may be changed, as appropriate.

For example, in the embodiment, the airbag control unit 300 performs collision determination by using an output from any one of the collision sensors 301. Alternatively or additionally, the airbag control unit 300 may perform the collision determination by using outputs from physical sensors, such as the vehicle speed sensor 101, the yaw rate sensor 102, the forward-rearward acceleration sensor 103, and the lateral acceleration sensor 104, for controlling the motion of the vehicle.

2. In the embodiment, a braking force is generated in various kinds of braking control after a side collision by using a hydraulic service brake. Alternatively, for example, a braking force may be generated by using, for example, either one of a regenerative brake using a motor generator and an electric brake, such as an electric parking brake, capable of performing dynamic braking.

3. In the embodiment, roll suppression control commences after a side collision occurs. Alternatively, for example, the environment recognition unit 200 may be used as a side collision detector. When the side collision detector detects a sign of a side collision, the side collision detector may be configured to commence the roll suppression control before a collision actually occurs.

4. In the embodiment, when yaw amplification control is executed, braking forces are not generated on wheels except for the wheel (i.e., the wheel that is to act as a pivot point for the yaw behavior) to be braked. Alternatively, braking forces relatively small to an extent that the braking forces do not inhibit yaw behavior may be generated on the remaining wheels.

Accordingly, the embodiment of the disclosure can provide a vehicle control apparatus that reduces damage during a side collision by controlling a braking device.

The vehicle control apparatus 1 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the vehicle control apparatus 1 including the braking control unit 100, the hydraulic control unit 110, the environment recognition unit 200, and the airbag control unit 300. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A vehicle control apparatus to be applied to a vehicle, the vehicle control apparatus comprising:
    a braking controller configured to individually control braking forces of braking devices provided respectively for a left front wheel, a right front wheel, a left rear wheel, and a right rear wheel of the vehicle;
    a side collision detector configured to detect a side collision against the vehicle; and
    a yaw behavior detector configured to detect yaw behavior of a vehicle body of the vehicle,
    wherein the braking controller is configured to execute yaw amplification control, the yaw amplification control including
        in a case where the yaw behavior detector detects the yaw behavior after the side collision, the yaw behavior occurring in a direction in which a rear of the vehicle body slides toward a side opposite from a collision side relative to a front of the vehicle body, causing the braking device for only one of the left front wheel and the right front wheel to generate a braking force larger than each of braking forces for the other one of the left front wheel and the right front wheel, the left rear wheel, and the right rear wheel, wherein the only one of the left front wheel and the right front wheel is at the collision side, and in a case where yaw behavior detector detects the yaw behavior after the side collision, the yaw behavior occurring in a direction in which the front of the vehicle body slides toward the side opposite from the collision side relative to the rear of the vehicle body, causing the braking device for only one of the left rear wheel and the right rear wheel to generate a braking force larger than each of braking forces for the other one of the rear wheel and the right rear wheel, the left front wheel, and the right front wheel, wherein the only one of the left rear wheel and the right rear wheel is at the collision side.

2. The vehicle control apparatus according to claim 1, further comprising:

an environment recognizer configured to recognize an environment surrounding the vehicle, wherein the braking controller is configured to prohibit the yaw amplification control in a case where the environment recognizer recognizes a risky object near the vehicle.

3. The vehicle control apparatus according to claim 1, wherein the side collision detector is configured to detect an occurrence or a sign of the side collision, and in a case where the braking controller executes roll suppression control before executing the yaw amplification control in accordance with the occurrence or the sign of the side collision, the roll suppression control causes the braking devices for the one of the left front wheel and the right front wheel and the one of the left rear wheel and the right rear wheel at the collision side to generate braking forces.

4. The vehicle control apparatus according to claim 2, wherein the side collision detector is configured to detect an occurrence or a sign of the side collision, and in a case where the braking controller executes roll suppression control before executing the yaw amplification control in accordance with the occurrence or the sign of the side collision, the roll suppression control causes the braking devices for the one of the left front wheel and the right front wheel and the one of the left rear wheel and the right rear wheel at the collision side to generate braking forces.

5. The vehicle control apparatus according to claim 1, wherein, after executing the yaw amplification control, the braking controller is configured to control the braking devices respectively for the left front wheel, the right front wheel, the left rear wheel, and the right rear wheel to maintain the vehicle in a stopped state in accordance with whether behavior of the vehicle caused by the side collision has returned to normal.

6. The vehicle control apparatus according to claim 2, wherein, after executing the yaw amplification control, the braking controller is configured to control the braking devices respectively for the left front wheel, the right front wheel, the left rear wheel, and the right rear wheel to maintain the vehicle in a stopped state in accordance with whether behavior of the vehicle caused by the side collision has returned to normal.

7. The vehicle control apparatus according to claim 3, wherein, after executing the yaw amplification control, the braking controller is configured to control the braking devices respectively for the left front wheel, the right front wheel, the left rear wheel, and the right rear wheel to maintain the vehicle in a stopped state in accordance with whether behavior of the vehicle caused by the side collision has returned to normal.

8. The vehicle control apparatus according to claim 4, wherein, after executing the yaw amplification control, the braking controller is configured to control the braking devices respectively for the left front wheel, the right front wheel, the left rear wheel, and the right rear wheel to maintain the vehicle in a stopped state in accordance with whether behavior of the vehicle caused by the side collision has returned to normal.

9. A vehicle control apparatus to be applied to a vehicle, the vehicle control apparatus comprising:

circuitry configured to individually control braking forces of braking devices respectively provided for a left front wheel, a right front wheel, a left rear wheel, and a right rear wheel of the vehicle, detect a side collision against the vehicle, detect yaw behavior of a vehicle body of the vehicle, and execute yaw amplification control, the yaw amplification control including upon detecting the yaw behavior after the side collision, the yaw behavior occurring in a direction in which a rear of the vehicle body slides toward a side opposite from a collision side relative to a front of the vehicle body causing the braking device for only one of the left front wheel and the right front wheel to generate a braking force larger than each of braking forces for the other one of the left front wheel and the right front wheel, the left rear wheel, and the right rear wheel, wherein the only one of the left front wheel and the right front wheel is at the collision side, and upon detecting the yaw behavior after the side collision, the yaw behavior occurring in a direction in which the front of the vehicle body slides toward the side opposite from the collision side relative to the rear of the vehicle body, causing the braking device for only one of the left rear wheel and the right rear wheel to generate a braking force larger than each of braking forces for the other one of the rear wheel and the right rear wheel, the left front wheel, and the right front wheel, wherein the only one of the left rear wheel and the right rear wheel is at the collision side.

\* \* \* \* \*